United States Patent
Betker (10) Patent No.: US 7,480,293 B2
(45) Date of Patent: Jan. 20, 2009

(54) METHOD AND SYSTEM FOR PREVENTING DEADLOCK IN FIBRE CHANNEL FABRICS USING FRAME PRIORITIES

(75) Inventor: Steven M. Betker, Shore View, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 693 days.

(21) Appl. No.: 10/798,527

(22) Filed: Mar. 11, 2004

(65) Prior Publication Data
US 2005/0174936 A1    Aug. 11, 2005

Related U.S. Application Data

(60) Provisional application No. 60/542,186, filed on Feb. 5, 2004.

(51) Int. Cl.
*H04L 12/28* (2006.01)
*H04L 12/56* (2006.01)

(52) U.S. Cl. ...................... 370/389; 370/412

(58) Field of Classification Search ......... 370/412–418, 370/389
See application file for complete search history.

(56) References Cited

U.S. PATENT DOCUMENTS

| | | | |
|---|---|---|---|
| 4,081,612 A | 3/1978 | Hafner | |
| 4,162,375 A | 7/1979 | Schlichte | ..................... 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | .................... 370/58 |
| 4,546,468 A | 10/1985 | Christmas et al. | ............. 370/54 |

(Continued)

FOREIGN PATENT DOCUMENTS

EP    0649098    9/1994

(Continued)

OTHER PUBLICATIONS

International Preliminary Report on Patentability dated Apr. 3, 2007, for International patent application No. PCT/US2005/034844.

(Continued)

*Primary Examiner*—Kevin C Harper
(74) *Attorney, Agent, or Firm*—Klein, O'Neill & Singh, LLP (57) ABSTRACT

A method and system for transmitting frames using a fibre channel switch is provided. The method includes, determining a frame's priority based on a hop count for the frame; placing a frame in a priority queue, where the priority queue is dedicated to frames having similar priorities; selecting a frame for transmission based on the frame's priority, if credit is available, where a frame with a higher priority is sent before a frame with a lower priority; and selecting a frame with a lower priority if enough higher priority frames have been sent. The system includes a switch with at least two priority queues for placing frames with different priorities; a counter that keeps track of frames that are transmitted from the two priority queues; and a credit control module that determines if credit is available before sending a particular frame.

11 Claims, 6 Drawing Sheets

U.S. PATENT DOCUMENTS

| | | | |
|---|---|---|---|
| 4,569,043 A | 2/1986 | Simmons et al. ............... 370/63 |
| 4,691,296 A | 9/1987 | Struger |
| 4,716,561 A | 12/1987 | Angell et al. |
| 4,725,835 A | 2/1988 | Schreiner et al. ....... 340/825.83 |
| 4,821,034 A | 4/1989 | Anderson et al. ........... 340/825 |
| 4,860,193 A | 8/1989 | Bentley et al. |
| 4,980,857 A | 12/1990 | Walter et al. |
| 5,025,370 A | 6/1991 | Koegel et al. |
| 5,051,742 A | 9/1991 | Hullett et al. |
| 5,090,011 A | 2/1992 | Fukuta et al. |
| 5,115,430 A | 5/1992 | Hahne et al. |
| 5,144,622 A | 9/1992 | Takiyasu et al. ......... 370/85.13 |
| 5,260,933 A | 11/1993 | Rouse |
| 5,260,935 A | 11/1993 | Turner |
| 5,339,311 A | 8/1994 | Turner |
| 5,367,520 A | 11/1994 | Cordell ........................ 370/60 |
| 5,390,173 A | 2/1995 | Spinney et al. |
| 5,537,400 A | 7/1996 | Diaz et al. |
| 5,568,165 A | 10/1996 | Kimura |
| 5,590,125 A | 12/1996 | Acampora et al. |
| 5,594,672 A | 1/1997 | Hicks |
| 5,598,541 A | 1/1997 | Malladi ...................... 395/286 |
| 5,610,745 A | 3/1997 | Bennett ...................... 359/139 |
| 5,666,483 A | 9/1997 | McClary |
| 5,677,909 A | 10/1997 | Heide |
| 5,687,172 A | 11/1997 | Cloonan et al. ............. 370/395 |
| 5,732,206 A | 3/1998 | Mendel |
| 5,748,612 A | 5/1998 | Stoevhase et al. ........... 370/230 |
| 5,764,927 A | 6/1998 | Murphy et al. |
| 5,768,271 A | 6/1998 | Seid et al. |
| 5,768,533 A | 6/1998 | Ran |
| 5,784,358 A | 7/1998 | Smith et al. |
| 5,790,545 A | 8/1998 | Holt et al. |
| 5,790,840 A | 8/1998 | Bulka et al. |
| 5,818,842 A | 10/1998 | Burwell et al. .............. 370/397 |
| 5,821,875 A | 10/1998 | Lee et al. |
| 5,822,300 A | 10/1998 | Johnson et al. |
| 5,825,748 A | 10/1998 | Barkey et al. |
| 5,828,475 A | 10/1998 | Bennett et al. |
| 5,835,752 A | 11/1998 | Chiang et al. |
| 5,850,386 A | 12/1998 | Anderson et al. |
| 5,894,560 A | 4/1999 | Carmichael et al. |
| 5,936,442 A | 8/1999 | Liu et al. |
| 5,954,796 A | 9/1999 | McCarty et al. |
| 5,974,547 A | 10/1999 | Klimenko |
| 5,978,379 A | 11/1999 | Chan et al. |
| 5,987,028 A | 11/1999 | Yang et al. ................... 370/380 |
| 5,999,528 A | 12/1999 | Chow et al. .................. 370/365 |
| 6,011,779 A | 1/2000 | Wills |
| 6,014,383 A | 1/2000 | McCarty ..................... 370/453 |
| 6,021,128 A | 2/2000 | Hosoya et al. .............. 370/380 |
| 6,031,842 A | 2/2000 | Trevitt et al. |
| 6,046,979 A | 4/2000 | Bauman |
| 6,047,323 A | 4/2000 | Krause ....................... 709/227 |
| 6,061,360 A | 5/2000 | Miller et al. |
| 6,081,512 A | 6/2000 | Muller et al. ............... 370/256 |
| 6,108,738 A | 8/2000 | Chambers et al. |
| 6,108,778 A | 8/2000 | LaBerge |
| 6,118,776 A | 9/2000 | Berman |
| 6,128,292 A | 10/2000 | Kim et al. ................... 370/356 |
| 6,134,127 A | 10/2000 | Kirchberg |
| 6,144,668 A | 11/2000 | Bass et al. |
| 6,151,644 A | 11/2000 | Wu |
| 6,158,014 A | 12/2000 | Henson |
| 6,160,813 A | 12/2000 | Banks et al. ................ 370/422 |
| 6,185,203 B1 | 2/2001 | Berman |
| 6,209,089 B1 | 3/2001 | Selitrennikoff et al. |
| 6,229,822 B1 | 5/2001 | Chow et al. |
| 6,230,276 B1 | 5/2001 | Hayden |
| 6,240,096 B1 | 5/2001 | Book |
| 6,252,891 B1 | 6/2001 | Perches |
| 6,253,267 B1 | 6/2001 | Kim et al. |
| 6,286,011 B1 | 9/2001 | Velamuri et al. |
| 6,289,002 B1 | 9/2001 | Henson et al. |
| 6,301,612 B1 | 10/2001 | Selitrennikoff et al. |
| 6,308,220 B1 | 10/2001 | Mathur ...................... 709/238 |
| 6,324,181 B1 | 11/2001 | Wong et al. ................. 370/403 |
| 6,330,236 B1 | 12/2001 | Ofek et al. .................. 370/369 |
| 6,333,932 B1 | 12/2001 | Kobayasi et al. |
| 6,335,935 B2 | 1/2002 | Kadambi et al. |
| 6,343,324 B1 | 1/2002 | Hubis et al. |
| 6,353,612 B1 | 3/2002 | Zhu et al. |
| 6,370,605 B1 | 4/2002 | Chong |
| 6,401,128 B1 | 6/2002 | Stai et al. |
| 6,404,749 B1 | 6/2002 | Falk |
| 6,411,599 B1 | 6/2002 | Blanc et al. ................. 370/219 |
| 6,411,627 B1 | 6/2002 | Hullett et al. |
| 6,418,477 B1 | 7/2002 | Verma |
| 6,421,342 B1 | 7/2002 | Schwartz et al. |
| 6,421,711 B1 | 7/2002 | Blumenau et al. |
| 6,424,658 B1 | 7/2002 | Mathur ...................... 370/429 |
| 6,438,628 B1 | 8/2002 | Messerly et al. |
| 6,449,274 B1 | 9/2002 | Holden et al. ............... 370/392 |
| 6,452,915 B1 | 9/2002 | Jorgensen |
| 6,470,026 B1 | 10/2002 | Pearson et al. |
| 6,509,988 B1 | 1/2003 | Saito |
| 6,522,656 B1 | 2/2003 | Gridley |
| 6,532,212 B1 | 3/2003 | Soloway et al. |
| 6,570,850 B1 | 5/2003 | Gutierrez et al. |
| 6,570,853 B1 | 5/2003 | Johnson et al. |
| 6,594,231 B1 | 7/2003 | Byham et al. |
| 6,597,691 B1 | 7/2003 | Anderson et al. ........... 370/360 |
| 6,597,777 B1 | 7/2003 | Ho |
| 6,606,690 B2 | 8/2003 | Padovano |
| 6,614,796 B1 | 9/2003 | Black et al. |
| 6,622,206 B1 | 9/2003 | Kanamaru et al. |
| 6,643,298 B1 | 11/2003 | Brunheroto et al. |
| 6,657,962 B1 | 12/2003 | Barri et al. |
| 6,684,209 B1 | 1/2004 | Ito et al. |
| 6,697,359 B1 | 2/2004 | George ....................... 370/357 |
| 6,697,368 B2 | 2/2004 | Chang et al. |
| 6,697,914 B1 | 2/2004 | Hospodor et al. |
| 6,718,497 B1 | 4/2004 | Whitby-Strevens |
| 6,738,381 B1 | 5/2004 | Agnevik et al. |
| 6,744,772 B1 | 6/2004 | Eneboe et al. |
| 6,760,302 B1 | 7/2004 | Ellinas et al. |
| 6,779,083 B2 | 8/2004 | Ito et al. |
| 6,785,241 B1 | 8/2004 | Lu et al. |
| 6,807,181 B1 | 10/2004 | Weschler |
| 6,816,492 B1 | 11/2004 | Turner et al. |
| 6,816,750 B1 | 11/2004 | Klaas |
| 6,859,435 B1 * | 2/2005 | Lee et al. ..................... 370/231 |
| 6,865,157 B1 | 3/2005 | Scott et al. |
| 6,886,141 B1 | 4/2005 | Kunz et al. |
| 6,888,831 B1 | 5/2005 | Hospodor et al. |
| 6,901,072 B1 | 5/2005 | Wong |
| 6,904,507 B2 | 6/2005 | Gil |
| 6,922,408 B2 | 7/2005 | Bloch et al. |
| 6,928,470 B1 | 8/2005 | Hamlin |
| 6,934,799 B2 | 8/2005 | Acharya et al. |
| 6,941,357 B2 | 9/2005 | Nguyen et al. |
| 6,941,482 B2 | 9/2005 | Strong |
| 6,947,393 B2 | 9/2005 | Hooper, III |
| 6,952,659 B2 | 10/2005 | King et al. |
| 6,968,463 B2 | 11/2005 | Pherson et al. |
| 6,987,768 B1 | 1/2006 | Kojima et al. |
| 6,988,130 B2 | 1/2006 | Blumenau et al. |
| 6,988,149 B2 | 1/2006 | Odenwald |
| 7,000,025 B1 | 2/2006 | Wilson |
| 7,002,926 B1 | 2/2006 | Eneboe et al. |
| 7,010,607 B1 | 3/2006 | Bunton |
| 7,024,410 B2 | 4/2006 | Ito et al. |
| 7,039,070 B2 | 5/2006 | Kawakatsu |
| 7,039,870 B2 | 5/2006 | Takaoka et al. |

| | | |
|---|---|---|
| 7,047,326 B1 | 5/2006 | Crosbie et al. |
| 7,050,392 B2 | 5/2006 | Valdevit |
| 7,051,182 B2 | 5/2006 | Blumenau et al. |
| 7,055,068 B2 | 5/2006 | Riedl |
| 7,061,862 B2 | 6/2006 | Horiguchi et al. |
| 7,061,871 B2 | 6/2006 | Sheldon et al. |
| 7,076,569 B1 | 7/2006 | Bailey et al. |
| 7,092,374 B1 | 8/2006 | Gubbi |
| 7,110,394 B1 | 9/2006 | Chamdani et al. |
| 7,120,728 B2 | 10/2006 | Krakirian et al. |
| 7,123,306 B1 | 10/2006 | Goto et al. |
| 7,124,169 B2 | 10/2006 | Shimozono et al. |
| 7,150,021 B1 | 12/2006 | Vajjhala et al. |
| 7,151,778 B2 | 12/2006 | Zhu et al. |
| 7,171,050 B2 | 1/2007 | Kim |
| 7,185,062 B2 | 2/2007 | Lolayekar et al. |
| 7,187,688 B2 | 3/2007 | Garmire et al. |
| 7,188,364 B2 | 3/2007 | Volpano |
| 7,190,667 B2 | 3/2007 | Susnow et al. |
| 7,194,538 B1 | 3/2007 | Rabe et al. |
| 7,200,108 B2 | 4/2007 | Beer et al. |
| 7,200,610 B1 | 4/2007 | Prawdiuk et al. |
| 7,209,478 B2 | 4/2007 | Rojas et al. |
| 7,215,680 B2 | 5/2007 | Mullendore et al. |
| 7,221,650 B1 | 5/2007 | Cooper et al. |
| 7,230,929 B2 | 6/2007 | Betker et al. |
| 7,233,985 B2 | 6/2007 | Hahn et al. |
| 7,245,613 B1 | 7/2007 | Winkles et al. |
| 7,248,580 B2 | 7/2007 | George et al. |
| 7,263,593 B2 | 8/2007 | Honda et al. |
| 7,266,286 B2 | 9/2007 | Tanizawa et al. |
| 7,269,131 B2 | 9/2007 | Cashman et al. |
| 7,269,168 B2 | 9/2007 | Roy et al. |
| 7,277,431 B2 | 10/2007 | Walter et al. |
| 7,287,063 B2 | 10/2007 | Baldwin et al. |
| 7,292,593 B1 | 11/2007 | Winkles et al. |
| 7,315,511 B2 | 1/2008 | Morita et al. |
| 7,327,680 B1 | 2/2008 | Kloth |
| 7,346,707 B1 | 3/2008 | Erimli |
| 7,352,740 B2 | 4/2008 | Hammons et al. |
| 2001/0011357 A1 | 8/2001 | Mori |
| 2001/0022823 A1 | 9/2001 | Renaud |
| 2001/0033552 A1 | 10/2001 | Barrack et al. |
| 2001/0038628 A1 | 11/2001 | Ofek et al. .................. 370/392 |
| 2001/0043564 A1 | 11/2001 | Bloch et al. |
| 2001/0047460 A1 | 11/2001 | Kobayashi et al. |
| 2002/0016838 A1 | 2/2002 | Geluc et al. |
| 2002/0034178 A1 | 3/2002 | Schmidt et al. |
| 2002/0071387 A1 | 6/2002 | Horiguchi et al. |
| 2002/0103913 A1 | 8/2002 | Tawil et al. |
| 2002/0104039 A1 | 8/2002 | DeRolf et al. |
| 2002/0122428 A1 | 9/2002 | Fan et al. |
| 2002/0124124 A1 | 9/2002 | Matsumoto et al. |
| 2002/0147560 A1 | 10/2002 | Devins et al. |
| 2002/0147843 A1 | 10/2002 | Rao |
| 2002/0156918 A1 | 10/2002 | Valdevit et al. |
| 2002/0159385 A1 | 10/2002 | Susnow et al. |
| 2002/0172195 A1 | 11/2002 | Pekkala et al. |
| 2002/0174197 A1 | 11/2002 | Schimke et al. |
| 2002/0191602 A1 | 12/2002 | Woodring et al. |
| 2002/0194294 A1 | 12/2002 | Blumenau et al. |
| 2002/0196773 A1 | 12/2002 | Berman |
| 2003/0002503 A1 | 1/2003 | Brewer et al. |
| 2003/0016683 A1 | 1/2003 | George et al. |
| 2003/0021239 A1 | 1/2003 | Mullendore et al. |
| 2003/0026267 A1 | 2/2003 | Oberman et al. |
| 2003/0026287 A1 | 2/2003 | Mullendore et al. |
| 2003/0033487 A1 | 2/2003 | Pfister et al. |
| 2003/0035433 A1 | 2/2003 | Craddock et al. |
| 2003/0046396 A1 | 3/2003 | Richter et al. |
| 2003/0056000 A1 | 3/2003 | Mullendore et al. |
| 2003/0072316 A1 | 4/2003 | Niu et al. |
| 2003/0076788 A1 | 4/2003 | Grabauskas et al. |
| 2003/0079019 A1 | 4/2003 | Lolayekar et al. |
| 2003/0084219 A1 | 5/2003 | Yao et al. |
| 2003/0086377 A1 | 5/2003 | Berman |
| 2003/0091062 A1 | 5/2003 | Lay et al. |
| 2003/0093607 A1 | 5/2003 | Main et al. |
| 2003/0103451 A1 | 6/2003 | Lutgen et al. |
| 2003/0115355 A1 | 6/2003 | Cometto et al. |
| 2003/0117961 A1 | 6/2003 | Chuah et al. |
| 2003/0118053 A1 | 6/2003 | Edsall et al. |
| 2003/0120743 A1 | 6/2003 | Coatney et al. |
| 2003/0120983 A1 | 6/2003 | Vieregge et al. |
| 2003/0126223 A1 | 7/2003 | Jenne et al. |
| 2003/0126242 A1 | 7/2003 | Chang |
| 2003/0131105 A1 | 7/2003 | Czeiger et al. |
| 2003/0137941 A1 | 7/2003 | Kaushik et al. |
| 2003/0139900 A1 | 7/2003 | Robison |
| 2003/0172149 A1 | 9/2003 | Edsall et al. |
| 2003/0172239 A1 | 9/2003 | Swank |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1 | 9/2003 | George et al. ............... 370/389 |
| 2003/0179755 A1 | 9/2003 | Fraser |
| 2003/0189930 A1 | 10/2003 | Terrell et al. |
| 2003/0189935 A1 | 10/2003 | Warden et al. |
| 2003/0191857 A1 | 10/2003 | Terell et al. |
| 2003/0195983 A1 | 10/2003 | Krause |
| 2003/0198238 A1 | 10/2003 | Westby |
| 2003/0218986 A1 | 11/2003 | DeSanti et al. |
| 2003/0229808 A1 | 12/2003 | Heintz et al. |
| 2003/0236953 A1 | 12/2003 | Grieff et al. |
| 2004/0013088 A1 | 1/2004 | Gregg |
| 2004/0013092 A1 | 1/2004 | Betker et al. |
| 2004/0013113 A1 | 1/2004 | Singh et al. |
| 2004/0013125 A1 | 1/2004 | Betker et al. |
| 2004/0015638 A1 | 1/2004 | Bryn |
| 2004/0024831 A1 | 2/2004 | Yang et al. |
| 2004/0028038 A1 | 2/2004 | Anderson et al. |
| 2004/0054776 A1 | 3/2004 | Klotz et al. |
| 2004/0054866 A1 | 3/2004 | Blumenau et al. |
| 2004/0057389 A1 | 3/2004 | Klotz et al. |
| 2004/0064664 A1 | 4/2004 | Gil |
| 2004/0081186 A1 | 4/2004 | Warren et al. |
| 2004/0081196 A1 | 4/2004 | Elliott |
| 2004/0081394 A1 | 4/2004 | Biren et al. |
| 2004/0085955 A1 | 5/2004 | Walter et al. |
| 2004/0085974 A1 | 5/2004 | Mies et al. |
| 2004/0085994 A1 | 5/2004 | Warren et al. |
| 2004/0092278 A1* | 5/2004 | Diepstraten et al. ......... 455/512 |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0141521 A1 | 7/2004 | George ..................... 370/463 |
| 2004/0151188 A1 | 8/2004 | Maveli et al. |
| 2004/0153526 A1 | 8/2004 | Haun et al. |
| 2004/0153914 A1 | 8/2004 | El-Batal |
| 2004/0174813 A1 | 9/2004 | Kasper et al. |
| 2004/0202189 A1 | 10/2004 | Arndt et al. |
| 2004/0208201 A1 | 10/2004 | Otake |
| 2004/0267982 A1 | 12/2004 | Jackson et al. |
| 2005/0023656 A1 | 2/2005 | Leedy |
| 2005/0036499 A1 | 2/2005 | Dutt et al. |
| 2005/0036763 A1 | 2/2005 | Kato et al. |
| 2005/0047334 A1 | 3/2005 | Paul et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0108444 A1 | 5/2005 | Flauaus et al. |
| 2005/0117522 A1 | 6/2005 | Basavaiah et al. |
| 2005/0177641 A1 | 8/2005 | Yamagami |
| 2005/0198523 A1 | 9/2005 | Shanbhag et al. |
| 2006/0013248 A1 | 1/2006 | Mujeeb et al. |

| | | | |
|---|---|---|---|
| 2006/0034192 A1 | 2/2006 | Hurley et al. | |
| 2006/0034302 A1 | 2/2006 | Peterson | |
| 2006/0047852 A1 | 3/2006 | Shah et al. | |
| 2006/0074927 A1 | 4/2006 | Sullivan et al. | |
| 2006/0107260 A1 | 5/2006 | Motta | |
| 2006/0143300 A1 | 6/2006 | See et al. | |
| 2006/0184711 A1 | 8/2006 | Pettey | |
| 2006/0203725 A1 | 9/2006 | Paul et al. | |
| 2006/0274744 A1 | 12/2006 | Nagai et al. | |
| 2007/0206502 A1 | 9/2007 | Martin et al. | |

FOREIGN PATENT DOCUMENTS

| | | |
|---|---|---|
| EP | 0856969 | 1/1998 |
| WO | WO-98/36537 | 8/1998 |
| WO | WO-01/95566 | 12/2001 |
| WO | WO03/088050 | 10/2003 |

OTHER PUBLICATIONS

International Preliminary Report on Patentability dated Apr. 3, 2007, for International patent application No. PCT/US2005/034758.
International Preliminary Report on Patentability dated Apr. 11, 2007, for International patent application No. PCT/US2005/034845.
International Preliminary Report on Patentability dated Apr. 3, 2007, for International patent application No. PCT/US2005/035064.
International Preliminary Report on Patentability dated Jul. 24, 2007, for International patent application No. PCT/US2005/42528.
Naik, D. "Inside Windows Storage: Server Storage Technologies for Windows 2000, Windows Server 2003 and Beyond", *Addison-Wesley*, US, Chapter 5, XP-002381152, (Jul. 15, 2003),137-173.
"Deliver Server-Free Backup", *Pathlight & Computer Associates*, White Paper of Apr. 2000, Ithaca, New York, XP-002381153,1-8.
Brown, Douglas W., "A State-Machine Synthesizer", *18th Design Automation Conference*, (1981),301-305.
Clark, Tom, "Zoning for Fibre Channel Fabrics", Vixel Corporation Paper—XP002185194., (Aug. 1999), pp. 1-6.
Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.
Martin, Charles R., "Fabric Interconnection of fibre channel standard nodes", Proceedings of the SPIE, (Sep. 8, 1992), pp. 65-71.
Yoshida, Hu, "LUN Security Considerations for Storage Area Networks," Hitachi Data Systems Paper—XP 002185193 (1999), pp. 1-7.
Claudio DeSanti, "Virtual Fabrics Switch Support" ; VF Switch Support, T11/04-395v2. Sep. 2004, pp. 1-15.
Pelissier et al, "Inter-Fabric Routing" , dated Jul. 30, 2004, Inter Fabric Routing (04-520v0); pp. 1-31.
DeSanti et al, "Virtual Fabrics"; Virtual Fabrics, T11/03-352v0, May 2003; pp. 1-4.
Martin et al , "Virtual Channel Architecture" , Presentation by Brocade to T11/03-369V0 dated Jun. 2, 2003.
"Examination Report from the European Patent Office dated Oct. 12, 2007 for European Application No. 05 805 632.6".
Malavalli, et al., "Fibre Channel Framing and Signaling (FC-FS) Rev 1.10", *NCITS working draft proposed American National Standard for Information Technology*, (Jan. 25, 2001).
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Sep. 6, 2007 for U.S. Appl. No. 10/889,337".
"Office Action from USPTO dated Dec. 7, 2007 for U.S. Appl. No. 10/961,463".
"Notice of Allowance from USPTO dated Dec. 21, 2007 for U.S. Appl. No. 10/961,463".
"Notice of Allowance from USPTO dated Dec. 20, 2007 for U.S. Appl. No. 10/889,337".
"Notice of Allowance from USPTO dated Jan. 8, 2008 for U.S. Appl. No. 10/889,551".
"Office Action from USPTO dated Jan. 9, 2008 for U.S. Appl. No. 10/798,468".
"Office Action from USPTO dated Jan. 9, 2008 for U.S. Appl. No. 11/608,634".
"Notice of Allowance from USPTO dated Jan. 11, 2008 for U.S. Appl. No. 10/664,548".
"Notice of Allowance from USPTO dated Jan. 10, 2008 for U.S. Appl. No. 10/263,858".
"Office Action from USPTO dated Jan. 19, 2006 for U.S. Appl. No. 10/212,425".
"Office Action from USPTO dated Dec. 5, 2006 for U.S. Appl. No. 10/212,425".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Office Action from USPTO dated Nov. 15, 2006 for U.S. Appl. No. 10/263,858".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 for U.S. Appl. No. 10/664,548".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Notice of Allowance from USPTO dated Feb. 8, 2008 for U.S. Appl. No. 10/894,529".
"Office Action from USPTO dated Feb. 12, 2008 for U.S. Appl. No. 11/057,912".
"Office Action from USPTO dated Mar. 5, 2008 for U.S. Appl. No. 10/889,259".

"Office Action from USPTO dated Mar. 7, 2008 for U.S. Appl. No. 10/894,629".
"Office Action from USPTO dated Mar. 20, 2008 for U.S. Appl. No. 10/894,732".
"Office Action from USPTO dated Apr. 4, 2008 for U.S. Appl. No. 10/957,465".
"Notice of Allowance from USPTO dated Apr. 10, 2008 for U.S. Appl. No. 10/241,153".
"Office Action from USPTO dated Apr. 11, 2008 for U.S. Appl. No. 10/894,595".
"Office Action from USPTO dated Apr. 14, 2008 for U.S. Appl. No. 10/894,627".
"Office Action from USPTO dated Apr. 17, 2008 for U.S. Appl. No. 10/894,689".
"Notice of Allowance from USPTO dated Apr. 18, 2008 for U.S. Appl. No. 10/894,597".
"Final Office Action from USPTO dated Apr. 23, 2008 for U.S. Appl. No. 10/889,255".
"Final Office Action from USPTO dated Apr. 25, 2008 for U.S. Appl. No. 10/894,579".
"Final Office Action from USPTO dated Apr. 1, 2008 for U.S. Appl. No. 10/956,717".
"Office Action from USPTO dated Apr. 3, 2008 for U.S. Appl. No. 10/894,587".
"Notice of Allowance from USPTO dated Apr. 4, 2008 for U.S. Appl. No. 11/608,634".
"Final Office Action from USPTO dated May 21, 2008 for U.S. Appl. No. 10/889,635".
"Final Office Action from USPTO dated Apr. 29, 2008 for U.S. Appl. No. 10/894,491".
"Final Office Action from USPTO dated May 12, 2008 for U.S. Appl. No. 10/894,492".
"Office Action from USPTO dated May 14, 2008 for U.S. Appl. No. 10/956,502".
"Final Office Action from USPTO dated Jun. 4, 2008 for U.S. Appl. No. 10/894,978".
"Final Office Action from USPTO dated Jun. 5, 2008 for U.S. Appl. No. 10/889,267".
"Office Action from USPTO dated May 2, 2008 for U.S. Appl. No. 11/037,922".
"Final Office Action from USPTO dated Jun. 10, 2008 for U.S. Appl. No. 10/894,586".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 26, 2008 for U.S. Appl. No. 10/894,547".
"Office Action from USPTO dated Jun. 27, 2008 for U.S. Appl. No. 10/894,726".
"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Notice of Allowance from USPTO dated Jul. 9, 2008 for U.S. Appl. No. 10/894,579".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Office Action from State Intellectual Property Office (SIPO) of China for Chinese application 200580032889.0".
"Final Office Action from USPTO Dated Aug. 4, 2008 for U.S. Appl. No. 10/894,732".
"Final Office Action from USPTO dated Aug. 20, 2008 for U.S. Appl. No. 10/798,468".
"Office Action from USPTO dated Sep. 18, 2008 for U.S. Appl. No. 10/894,978".
Banks, David C., et al., "Link Trunking and Measuring Link Latency in Fibre Channel Fabric", U.S. Appl. No. 60/286,046, 1-52.
Curtis, A. R., "Design Considerations for 10-Gbit Fibre Channel", Curtis A. Ridgeway, *Distinguished I/O Architect, Storage and Computing ASIC's Division, LSI Logic Corp.*, Apr. 15, 2003.
Malavalli, Kumar, "High Speed Fibre Channel Switching Fabric Devices", *Proceedings of the SPIE, SPIE*, Bellingham, VA, USA vol. 1577,, XP000562869, ISSN: 0277-786X,(Sep. 4, 1991),216-226.
Melhem, et al., "Minimizing Wavelength Conversions in WDM Path Establishment", *Computer Science Department, University of Pittsburgh*, Pittsburgh, PA 15260, (2001),197-211.
Ridgeway, Curt, "0GFC-40GFC using 4-lane XAUI's", *LSI Logic Presentation*—T11/03-069v0, Feb. 3, 2003.
"Notice of Allowance from USPTO dated Aug. 18, 2008 for U.S. Appl. No. 10/889,259".

* cited by examiner

Fibre Channel Switch
Figure 2

METHOD AND SYSTEM FOR PREVENTING DEADLOCK IN FIBRE CHANNEL FABRICS USING FRAME PRIORITIES

CROSS REFERENCE TO RELATED APPLICATIONS

This application claims priority to U.S. provisional patent application Ser. No. 60/542,186, filed on Feb. 5, 2004, the disclosure of which is incorporated herein by reference in its entirety.

BACKGROUND

1. Field of the Invention

The present invention relates to Fibre Channel systems, and more particularly, to reducing deadlock problems in Fibre Channel Fabrics.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

The following Fibre Channel standards are used for Fibre Channel systems and Fibre Channel Fabrics, and are incorporated herein by reference in their entirety:

ANSI INCITS xxx-200x Fibre Channel Framing and Signaling Interface (FC-FS)-T11/Project 1331D; and ANSI INCITS xxx-200x Fibre Channel Switch Fabric-3 (FC-SW-3), T11/Project 1508D.

As discussed above, a Fibre Channel Fabric can consist of multiple switches connected in an arbitrary topology. The links between the switches use a buffer-to-buffer credit scheme for flow control so that all frames transmitted have a receive buffer. Fabric deadlock may occur if a switch cannot forward frames because the recipient switch buffers (receive buffers) are full.

Figure 1A:
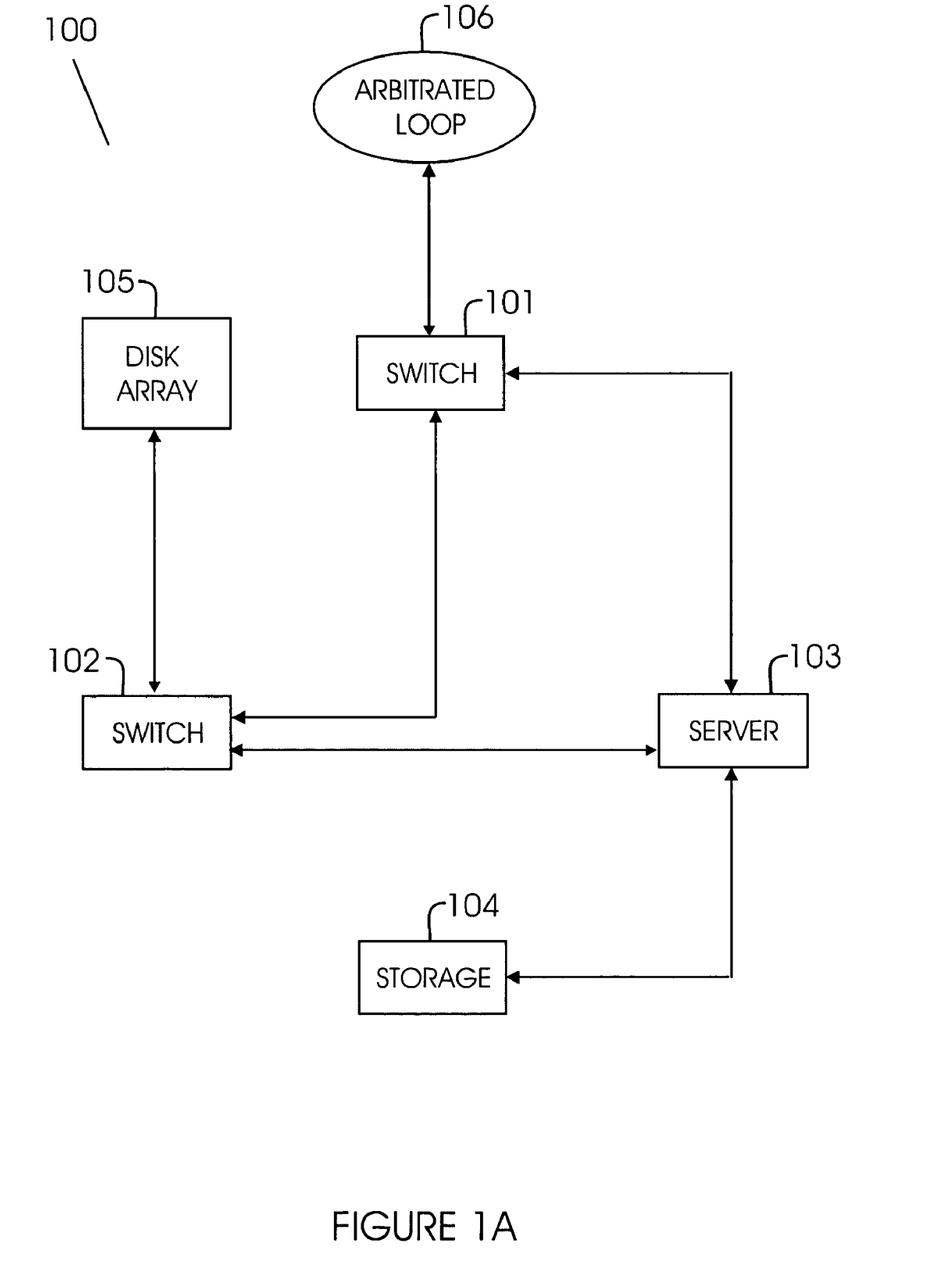
FIG. 1A is a block diagram of a fibre channel system in accordance with the present invention.
Figure 1B:
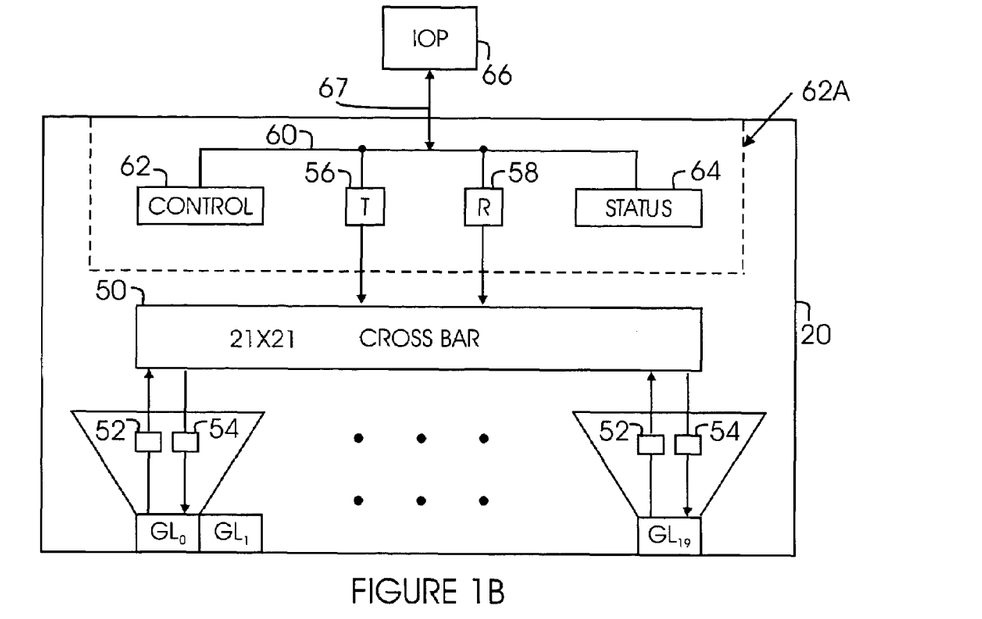
FIG. 1B is a block diagram of a 20-port ASIC fabric element in accordance with the present invention.
Figure 1C:
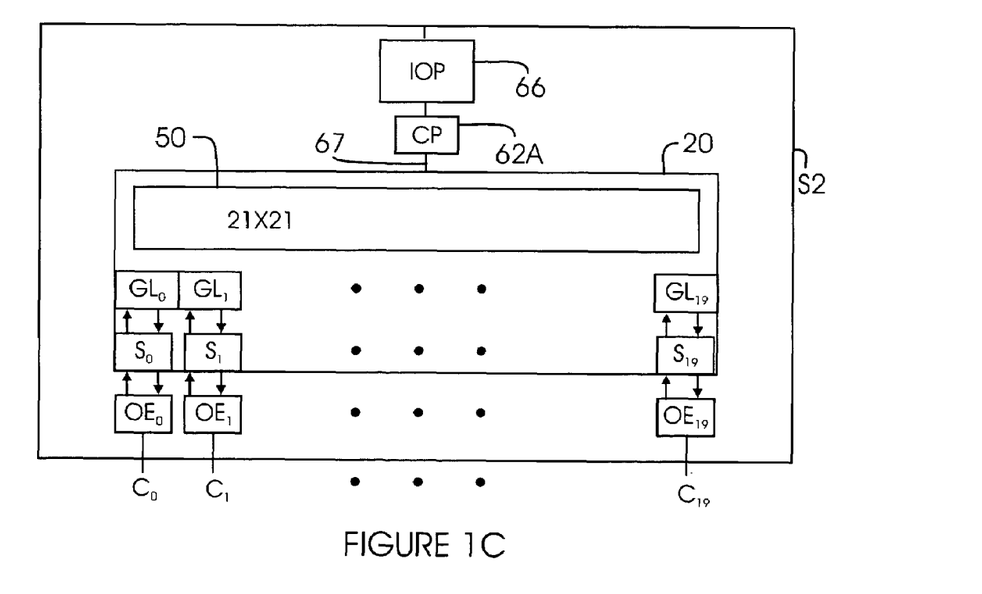
FIG. 1C is a block diagram of a 20-channel switch chassis in accordance with the present invention.
Figure 1D:
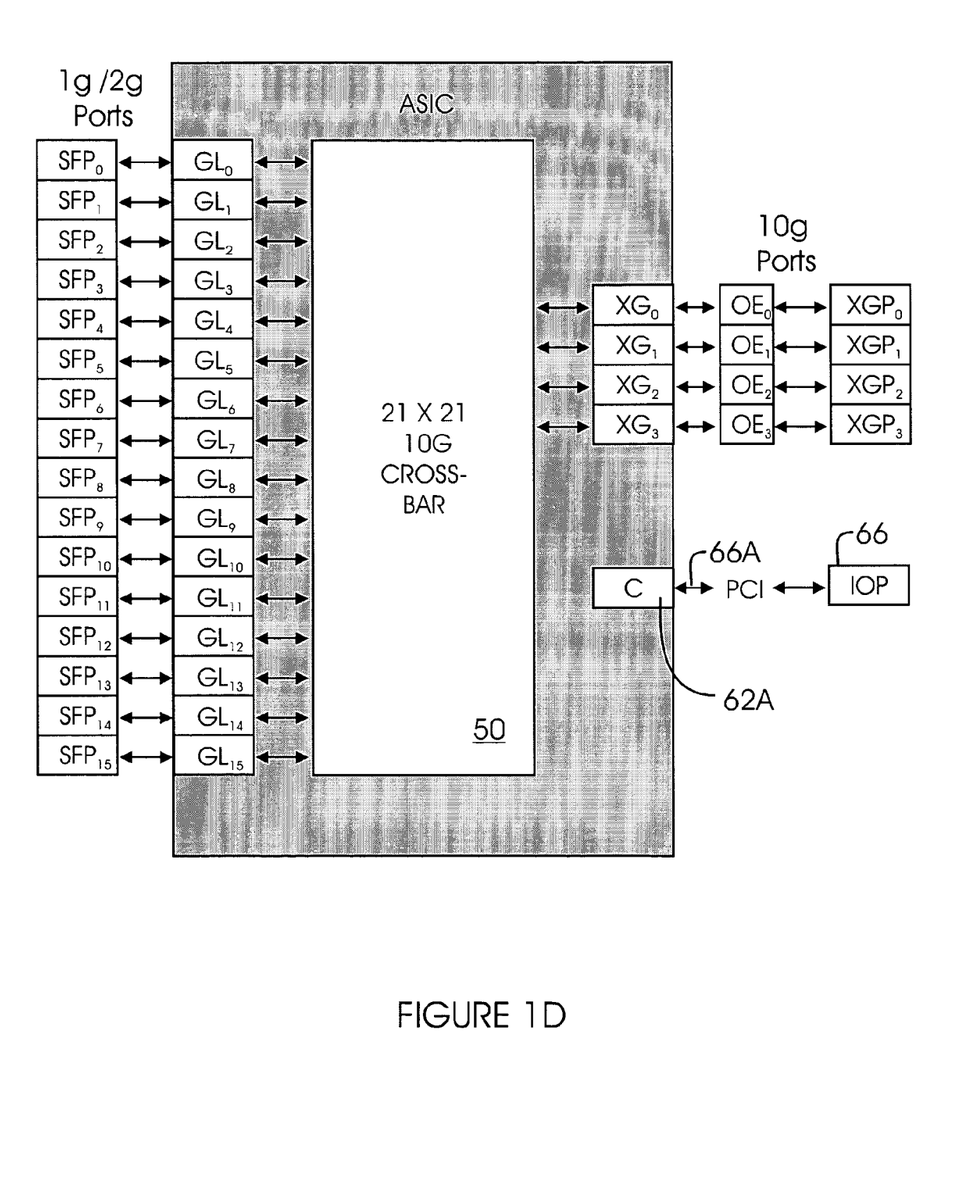
FIG. 1D is a block diagram of an ASIC in accordance with the present invention.
Figure 1E:
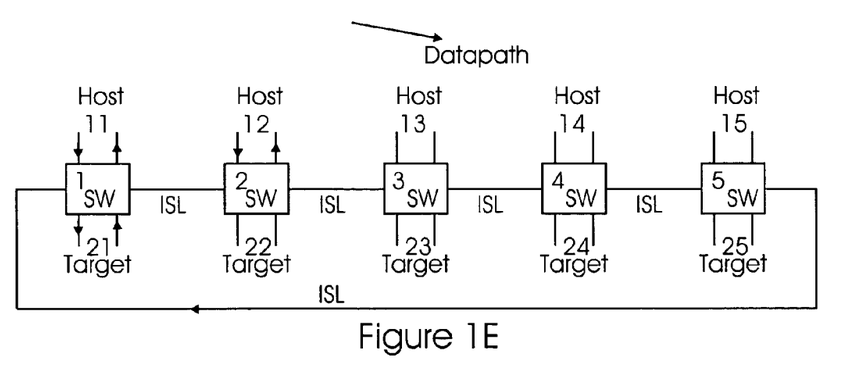
FIG. 1E is a block diagram of fibre channel switches according to the present invention.

The following example, described with respect to FIG. 1E, shows how a deadlock situation can occur. FIG. 1E shows five switches ("SW") 1, 2, 3, 4, and 5 that are linked together by ISLs (Inter Switch Links) in a ring topology. Host 11 and target 21 are linked to switch 1, host 12 and target 22 are linked to switch 2, and so forth.

In this example, hosts 11-15 can send data as fast as they can to a target that is two (2) hops (number of ISLs) away, for example:

Host 11 can send data to target 23;
Host 12 can send data to target 24;
Host 13 can send data to target 25;
Host 14 can send data to target 21; and
Host 15 can send data to target 22

For illustration purposes only, all traffic goes in the clockwise direction in FIG. 1E.

The receive buffers available for each ISL in the direction of traffic may get filled with frames addressed to the next switch. For example:

For the ISL between switch 1 and switch 2, the receive buffers on switch 2 get filled with frames for switch 3;
For the ISL between switch 2 and switch 3, the receive buffers on switch 3 get filled with frames for switch 4;
For the ISL between switch 3 and switch 4, the receive buffers on switch 4 get filled with frames for switch 5;
For the ISL between switch 4 and 5, the receive buffers on 5 get filled with frames for switch 1; and
For the ISL between switch 5 and switch 1, the receive buffers on switch 1 get filled with frames for switch 2.

The transmit side of a switch waits for R_RDYs before it can transmit any frames. If frames cannot be transmitted from one ISL, then the receive buffers for the other ISL cannot be emptied. If the receive buffers cannot be emptied, no R_RDY flow control signals can be transmitted, which deadlocks the Fabric.

Many large Fabrics have paths that form rings within them, especially if they are designed to avoid single points of failure by using redundant switches. Such network traffic patterns may result in a deadlock situation disrupting networks using fibre channel switches and components.

Therefore, there is need for a system and method for minimizing deadlock problems in fibre channel switches.

SUMMARY OF THE PRESENT INVENTION

In one aspect of the present invention, a method for transmitting frames using a fibre channel switch is provided. The method includes, determining a frame's priority based on a hop count for the frame; placing a frame in a priority queue, where the priority queue is dedicated to frames having similar priorities; selecting a frame for transmission based on the frame's priority, if credit is available, where a frame with a higher priority is sent before a frame with a lower priority; and selecting a frame with a lower priority if enough higher priority frames have been sent.

In another aspect of the present invention, a system for transmitting fibre channel frames is provided. The system includes a switch with at least two priority queues for placing frames with different priorities, where a frame's priority is based on a hop count depending upon the frame's destination;

a counter that keeps track of frames that are transmitted from the two priority queues; and a credit control module that determines if credit is available before sending a particular frame.

In yet another aspect of the present invention, a fibre channel switch having receive and transmit ports for transmitting frames is provided. The switch includes, at least two priority queues for placing frames with different priorities, where a frame's priority is based on a hop count depending upon the frame's destination; a counter that keeps track of frames that are transmitted from the two priority queues; and a credit control module that determines if credit is available before sending a particular frame.

In yet another aspect, a system for transmitting fibre channel frames is provided. The system includes, means for placing a frame in a priority queue, where the priority queue is dedicated to frames having similar priorities; means for selecting a frame for transmission based on the frame's priority, if credit is available, where a frame with a higher priority is sent before a frame with a lower priority; and means for selecting a frame with a lower priority if enough higher priority frames have been sent.

In yet another aspect of the present invention, a fibre channel switch having a receive port and a transmit port for transmitting fibre channel frames is provided. The switch includes, means for placing a frame in a priority queue, where the priority queue is dedicated to frames having similar priorities; means for selecting a frame for transmission based on the frame's priority, if credit is available, where a frame with a higher priority is sent before a frame with a lower priority; and means for selecting a frame with a lower priority if enough higher priority frames have been sent.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"D_ID": 24-bit fibre channel header field that contains destination address.

"EOF": End of Frame

"E-Port": A fabric expansion port that attaches to another Interconnect port to create an Inter-Switch Link.

"F-Port": A port to which non-loop N_Ports are attached to a fabric and does not include FL_ports.

"Fibre channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": A topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Inter-Switch Link" ("ISL"): A link directly connecting the E_port of one switch to the E_port of another switch.

Port: A general reference to N. Sub._Port or F.Sub._Port.

"L_Port": A port that contains Arbitrated Loop functions associated with the Arbitrated Loop topology.

"N-Port": A direct fabric attached port.

"NL_Port": A L_Port that can perform the function of a N_Port.

"R_RDY": Flow control primitive signal used for establishing credit. Receiving an R_RDY frame increases credit, while sending a R_RDY frame decreases credit.

"S_ID": 24-bit fibre channel header field that contains the source address of a frame.

"SOF": Start of Frame

"Switch": A fabric element conforming to the Fibre Channel Switch standards.

To facilitate an understanding of the preferred embodiment, the general architecture and operation of a fibre channel system will be described. The specific architecture and operation of the preferred embodiment will then be described with reference to the general architecture of the fibre channel system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packetswitched path may be established using multiple links, e.g. an N-Port in server 103 may establish a path with disk array 105 through switch 102.

FIG. 1B is a block diagram of a 20-port ASIC fabric element according to one aspect of the present invention. FIG. 1B provides the general architecture of a 20-channel switch chasis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for other fibre channel classes of service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL_Port can function as any type of port. Also, the GL_Port may function as a special port useful in fabric element linking, as described below.

For illustration purposes only, all GL_Ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL_Ports plus a port for connection to a fabric controller, which may be external or internal to ASIC 20.

In the preferred embodiments of switch chasis described herein, the fabric controller is a firmware-programmed microprocessor, also referred to as the input/output processor "IOP"). IOP 66 is shown in FIG. 1C as a part of a switch chasis utilizing one or more of ASIC 20. As seen in FIG. 1B, bi-directional connection to IOP 66 is routed through path 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL_Ports correspond to channel C0-Cl9. Each GL_Port has a serial/deserializer (SERDES) designated as S0-Sl9. Ideally, the SERDES functions are implemented on ASIC 20 for efficiency, but may alternatively be external to each GL_Port.

Each GL_Port may have an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

FIG. 1D shows a block diagram of ASIC 20 with sixteen GL_Ports designated as GL0-GL15 and four 10G port control modules designated as XG0-XG3. ASIC 20 include a control port 62A that is coupled to IOP 66 through a PCI connection 66A.

Figure 2:
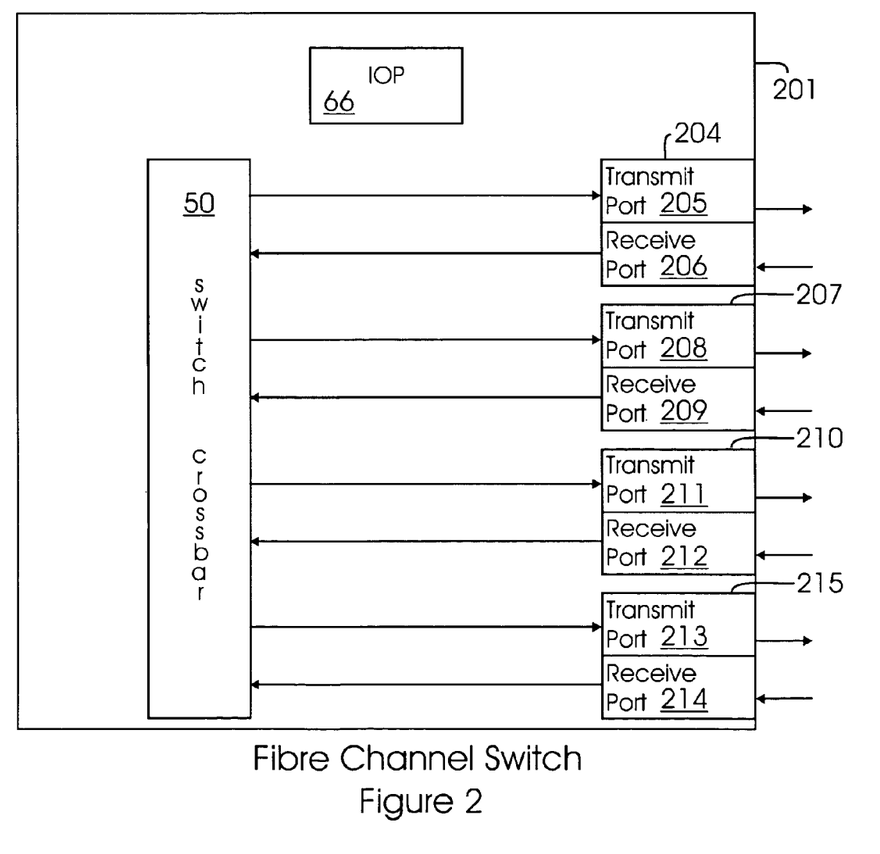
FIG. 2 is a block diagram of a switch chassis according to the present invention.

In the preferred embodiments of switch chassis described herein, the switch controller is a firmware-programmed microprocessor (IOP 66). IOP 66 is also shown in FIG. 2 as a part of a switch chassis 201, containing switch ports 204, 207, 210 and 215. Each port as described above has a transmit port (segment), for example, 205, 208, 211 and 213, and receive port (segment), for example, 206, 209, 212 and 214, that have been described above with respect to FIGS. 1B-1D.

Transmit and receive ports are connected by switch crossbar 50 so that they can transfer frames. IOP 66 controls and configures the switch ports.

In one aspect, the present invention prevents deadlocks on E-Ports by placing frames queued for transmission at a transmit port (for example, 205 in FIG. 2). The frames are placed in separate queues based on the number of "switch to switch" hops to a destination. Frames with lower hop counts get higher priority over frames that have higher hop counts. A system and method is provided such that low priority frames are also transmitted (especially when enough high priority frames cannot be transmitted). This allows all frames to be transmitted in a finite amount of time regardless of load, as long as the frame destinations can accept frames within a finite amount of time (which means all frames that enter the switch are delivered to their destination N-Ports). The number of receive buffers (for example, 206) for receiving incoming frames is greater than or equal to the maximum number of hops to destination switches.

Figure 3:
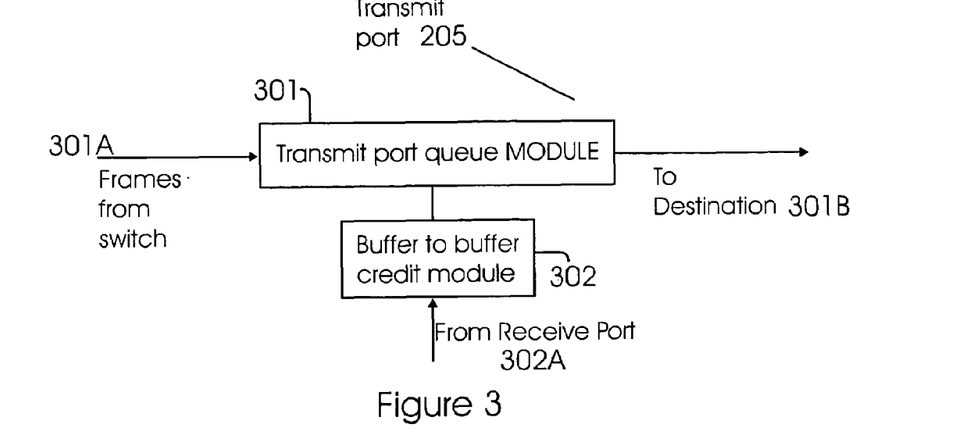
FIG. 3 is a block diagram of a port structure according to the present invention.

In one aspect of the present invention, FIG. 3 shows a transmit port (e.g. 205) with a transmit frame (port) queue module 301 (also referred to herein as "module 301") and buffer-to-buffer credit module 302. Frames are queued in module 301 as they are received from other ports (including receive ports, for example, 206) and routed to the transmit port (in this example, 205). Frames are transmitted (301B) from module 301 to a device linked to that port (e.g., 404, FIG. 4).

The buffer-to-buffer credit module 302 ensures that frames are only sent if the receiving end (i.e. the device/port that receives frame 301B (not shown in this example)) has a buffer available to receive the transmitted frame. Buffer to buffer credit module receives R_RDYs 302A from a receive port (in this example, 206). As described in FC-FS and FC-SW-3 (incorporated herein by reference in its entirety), a buffer-to-buffer credit count is initialized during port login. The count is decremented whenever a frame is sent. The count is incremented whenever an R_RDY primitive is received from the other end of the link.

Figure 4:
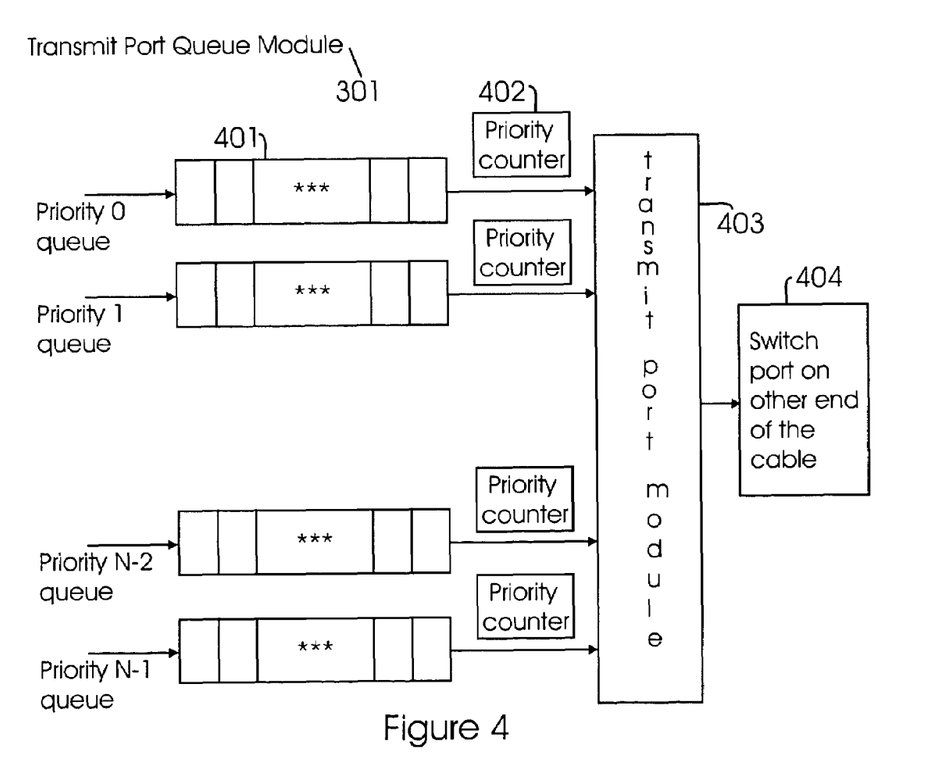
FIG. 4 is a block diagram of a queue module according to the present invention.

FIG. 4 shows transmit queue module 301 used to implement transmission priorities and decide which frame to transmit to port 404 of another switch (not shown). Port 404 is a port on another switch that is connected to transmit module 403 by a standard Fibre Channel cable.

Frame priority corresponds to a hop count, where hop count is the number of ISLs a frame has to traverse before it gets to its destination. For example, in FIG. 1E, for a frame being sent by Switch 1 to Switch 3 has a hop count of 2. The hop count for each destination is derived from the standard FSPF routing data exchanged by switches as described in FC-SW-3 standard.

In this embodiment each frame queued for transmission at a transmit port (for example, port 205) is assigned a priority number that is one less than the hop count, for example, a frame having a hop count of 2 has a priority 1. In this example, a lower priority number means that the frame has higher priority. However, the invention is not limited to how the priority numbers are assigned, for example, a higher number may be assigned to higher priority frames, as long as the hop count is used to assign the priority, and lower hop counts have higher priority.

Module 301 has an individual queue for each priority number. A frame is placed in a particular queue based on its priority number. For example, queue 401 has N−1 queues that are used for placing frames. Priority queue 0 keeps frames with priority number 0 (in this example, the highest priority frame), priority queue 1 keeps frames that have priority number 1, and so forth.

Every priority queue (0 to N−1) has a counter 402 that is used to avoid a situation where low priority frames are not sent because a switch has a constant flow of higher priority frames. Each counter 402 is initialized to 0 when transmit port 205 is initialized. Transmit module 403 uses the method described below to select a queue for frame transmission.

As described above, a frame with a lower hop count gets priority over a frame with a higher hop count. Each of counters 402 counts the number of tries that are made by the queue(s) to transmit a frame. A lower priority frame can be sent if the counter for the next highest priority is at 2 or if there are no higher priority frames and the total transmit credit available is greater than what is needed for the lower priority frame.

The number "2" ensures that more higher priority frames than lower priorities are sent if the higher priority frames are queued. A lower priority frame is not sent until either the sum of the empty receive buffers at port 404, and receive buffers filled with higher priority frames at 404, is greater than or equal the hop count for the lower priority frame. This ensures that higher priority frames can always be sent even after lower priority frames are sent, because enough receive buffers in 404 are either empty or contain higher priority frames that will be able to move on and empty those buffers.

It is noteworthy that the present invention is not limited to a counter value "2", any other value may be used to adapt the aspects of the present invention.

The foregoing allows frames with lower priority to be transmitted, while ensuring that whenever a lower priority frame is sent, the number of receive buffers at port 404 that are either empty or contain higher priority frames is greater than or equal to the hop count of the frame just transmitted. Counter 402 is cleared to zero whenever a lower priority frame (i.e. in this example, with a higher priority number) is sent.

The following provides an example with respect to FIG. 1E. The transmit port on switch 1 that is connected through the ISL to switch 2 has frames with hop count 1 (received from switch 5, destination target 22) and frames with hop count 2 (received from host 11, destination target 23). For every 2 frames sent with 1 hop count, 1 frame with hop count 2 is sent. Whenever a frame with hop count 2 is sent, at least one of the receive buffers on switch 2 is either empty or has a frame with destination target 22, which it can send and then empty the buffer. So frames with hop count 1 can always be sent, and the frames with hop count 2 can be sent after waiting for enough hop count 1 frames to be sent.

Figure 5:
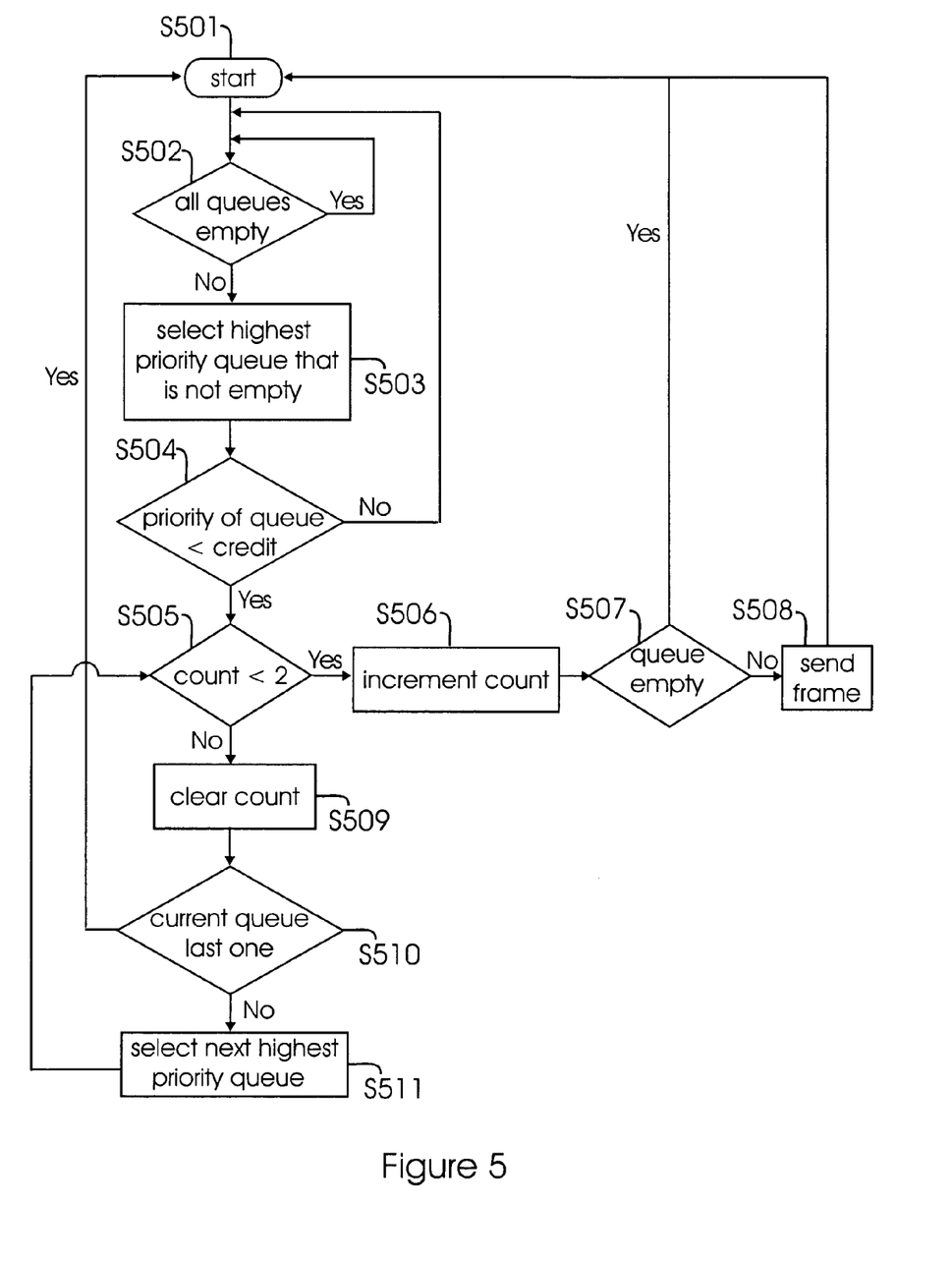
FIG. 5 is a flow diagram for frame transmission according to the present invention.

FIG. 5 shows a flow diagram of how frames are selected for transmission, according to one aspect of the present invention. It is noteworthy that combinatorial hardware logic may be used to select frames in a single clock cycle, according to one aspect of the present invention. The process starts in step S501 when a transmit port (in this example, 205) is ready to send a frame.

In step S502, if no transmit queues (401) have any frames, then port 205 waits for frames. If there are queued frames in 401, the process moves to step S503.

In step S503, the process selects the highest priority transmit queue (i.e. in this example, the queue with the lowest priority number (0 to N−1)) that has frames queued for transmission.

In step S504, the process determines if credit is available for transmitting the frame from the particular priority queue. This is performed by buffer-to-buffer credit module 302 (FIG. 3). If the available credit is less than what is required for the frame, then the process goes back to step S502. It is noteworthy that the available credit may change if R_RDY primitives are received later. If available credit is greater than or equal to what is required for the frame, the process goes to step S505.

In step S505, the process compares the count associated with a particular queue. Counter 402 performs this. In one aspect the count is compared with 2.

If the count is less than 2, the process goes to step S506. In step S506, the queue count (by counter 402) is incremented by 1, and the process goes to step S507. In step S507, if the particular queue is empty, the process goes back to S501, otherwise the frame is sent in step S508.

If the count is greater than 2, then in step S509 the count for the queue is cleared to 0, and the process goes to 510. In step S510, the process determines if this is the last (lowest priority) queue, if yes, then the process goes back to step S501. Otherwise the process moves to step S511. In step S511, the next highest priority queue is selected. This provides lower priority queues a chance to send frames. The process moves to step S505 to see if a frame from that queue can be transmitted.

It is assumed that all frames that arrive at a destination switch are delivered to N-ports. This means that all frames sent by a switch with priority 0 (1 hop count) will be delivered and the receive buffers at the receive end of the ISL will be freed, with R_RDYs being sent. Since priority 0 is highest, at least one receive buffer on every ISL will either be filled with a frame sent as priority 0, or be empty. Hence all frames queued at priority 0 can be sent, and all the receive buffers used for them can be cleared.

If all frames in a switch queued at priority N or higher can be sent, and if at any time there are at least N+1 receive buffers with higher priority frames or empty, then all neighboring switches will always be able to send priority N+1 frames (which become priority N when received). The requirement of at least N+1 receive buffers that are either empty or filled with higher priority frames is ensured by the algorithm for sending lower priority frames, which only sends lower priority frames if at least $2^{**}N$ higher priority frames have been sent, or if transmit credit (empty receive buffers) is greater than N.

In one aspect of the present invention, lower priority frames can be sent and deadlock situations can be reduced. This improves the overall efficiency of a network using fibre channel switches.

Although the present invention has been described with reference to specific embodiments, these embodiments are illustrative only and not limiting. Many other applications and embodiments of the present invention will be apparent in light of this disclosure and the following claims.

What is claimed is:

1. A method for transmitting frames between switches in a fibre chainnel network, comprising:
    determining priority for a plurality of frames based on a hop count for each frame, where a frame with a lesser hop count has a higher priority than a frame with a greater hop count;
    placing the frames in a plurality of priority queues, where each priority queue is dedicated to frames having similar priorities; and
    selecting frames for transmission based on each frame's priority;
    wherein higher priority frames are selected before lower priority frames until a threshold number of higher priority frames have been selected, after which at least one lower priority frame is selected if lower priority frames are pending.

2. The method of Claim 1, where a counter in each priority queue maintains a count of frames selected from that queue, and lower priority frames may be selected after the counter reaches the threshold number.

3. A system for transmitting fibre channel frames, comprising:
    a fibre channel switch with a transmit port the transmit port having at least two priority queues for placing frames with different priorities, where a frame's priority is based on a hop count that is in turn based upon the frame's destination;
    a counter associated with each queue, each counter being configured to count frames transmitted from its associated priority queue; and
    a credit control module configured to determine whether sufficient credit is available before sending a particular frame.

4. The system of Claim 3, wherein frames with higher hop counts have lower priority than frames with lower hop counts.

5. A fibre channel switch having a transmit port for transmitting frames, comprising:
    at least two priority queues for placing frames with different priorities, where a frame's priority is based on a hop count that is in turn based upon the frame's destination;
    a counter associated with each queue, each counter being configured to count frames transmitted from its associated priority queue: and
    a credit control module configured to determine if sufficient credit is available before sending a particular frame.

6. The fibre channel switch of claim 5, wherein frames with higher hop counts have lower priority than frames with lower hop counts.

7. The method of claim 1. further comprising the step of sending the selected frame if sufficient credit is available.

8. The method of claim 1 further comprising the step of sending the selected lower priority frame if a sum of empty receive buffers at a destination port and receive buffers at the destination port that are filled with higher priority frames is greater than or equal to the hop count for the selected lower priority frame.

9. The system of claim 3, wherein for lower priority frames the credit control module is configured to determine that sufficient credit is available when a sum of empty receive buffers at a destination port and receive buffers at the destination port that are filled with higher priority frames is greater than or equal to the hop count for the selected lower priority frame.

10. The fibre channel switch of Claim 6, wherein for lower priority frames the credit control module is configured to determine that sufficient credit is available when a sum of empty receive buffers at destination port and receive buffers at the destination port that are filled with higher priority frames is greater than or equal to the hop count for the selected lower priority frame.

11. A system for transmitting fibre channel frames, comprising:
    means for placing frames in a plurality of priority queues, where each priority queue is dedicated to frames having similar priorities;
    means for selecting frames for transmission based on each frame's priority;
    means for determining whether a sum of empty receive buffers at a destination port and received buffers at the destination port that are filled with higher priority frames is greater than or equal to the hop count for the selected lower priority frame;
    wherein higher priority frames are selected before lower priority frames until a threshold number of higher priority frames have been selected, after which at least one lower priority frames is selected if lower priority frames are pending.

* * * * *

UNITED STATES PATENT AND TRADEMARK OFFICE
CERTIFICATE OF CORRECTION

PATENT NO. : 7,480,293 B2 Page 1 of 1
APPLICATION NO. : 10/798527
DATED : January 20, 2009
INVENTOR(S) : Steven M. Betker It is certified that error appears in the above-identified patent and that said Letters Patent is hereby corrected as shown below:

In column 9, line 8, in Claim 1, delete "chaimel" and insert -- channel --, therefor.

In column 9, line 29, in Claim 3, delete "port the" and insert -- port, the --, therefor.

In column 9, line 49, in Claim 5, delete "queue:" and insert -- queue; --, therefor.

In column 10, line 7, in Claim 7, delete "claim 1." and insert -- claim 1, --, therefor.

In column 10, line 9, in Claim 8, delete "claim 1" and insert -- claim 1, --, therefor.

Signed and Sealed this

Eighteenth Day of May, 2010

David J. Kappos
*Director of the United States Patent and Trademark Office*